United States Patent
Webster

(10) Patent No.: US 9,763,534 B2
(45) Date of Patent: Sep. 19, 2017

(54) BREWER POD HOLDER

(71) Applicant: Joseph P. Webster, City of St. Charles, MO (US)

(72) Inventor: Joseph P. Webster, City of St. Charles, MO (US)

(73) Assignee: Newco Enterprises, Inc., St. Charles, MO (US)

( * ) Notice: Subject to any disclaimer, the term of this patent is extended or adjusted under 35 U.S.C. 154(b) by 233 days.

(21) Appl. No.: 14/121,962

(22) Filed: Nov. 6, 2014

(65) Prior Publication Data

US 2015/0107461 A1    Apr. 23, 2015

Related U.S. Application Data

(63) Continuation-in-part of application No. 29/442,709, filed on Apr. 24, 2013, now Pat. No. Des. 721,916.

(51) Int. Cl.
A47J 31/06    (2006.01)

(52) U.S. Cl.
CPC .................................. *A47J 31/0647* (2013.01)

(58) Field of Classification Search
CPC .................................................. A47J 31/0647
USPC ........................................... 99/295, 315–318
See application file for complete search history.

(56) References Cited

U.S. PATENT DOCUMENTS

| | | |
|---|---|---|
| 3,327,614 A * | 6/1967 | Nourse ............... A47J 31/3657 222/129.1 |
| D228,896 S | 10/1973 | Melnick et al. |
| D229,042 S | 11/1973 | Melnick et al. |
| D236,603 S | 9/1975 | Melnick et al. |
| 6,021,705 A * | 2/2000 | Dijs ..................... A47J 31/0678 99/295 |
| D432,284 S | 10/2000 | Lux, Jr. |
| 6,244,162 B1 * | 6/2001 | Dahmen ............. A47J 31/4478 426/433 |
| 6,260,476 B1 | 7/2001 | Pope |
| D446,900 S | 8/2001 | Koefelda et al. |
| 6,345,570 B1 * | 2/2002 | Santi ................... A47J 31/4467 99/289 R |
| 6,499,388 B2 * | 12/2002 | Schmed .............. A47J 31/3628 99/295 |
| 6,513,419 B2 * | 2/2003 | Huber ................. A47J 31/4478 426/433 |
| D485,659 S | 1/2004 | Medoff et al. |
| D486,355 S * | 2/2004 | Lyall, III ............ A47J 31/4478 D7/400 |
| 6,779,437 B2 * | 8/2004 | Sachtleben ......... A47J 31/4478 99/305 |
| 6,805,042 B2 * | 10/2004 | Mordini .................. A47J 31/06 99/295 |
| D508,300 S | 8/2005 | O'Dell et al. |
| 6,948,420 B2 | 9/2005 | Kirschner et al. |

(Continued)

*Primary Examiner* — Sean Michalski

(74) *Attorney, Agent, or Firm* — Paul M. Denk

(57) ABSTRACT

This invention relates to a disposable single serving coffee pod brewing device that includes upper and lower brew chambers, forming a pod holding chamber therein, a diffuser device that disseminates the incoming hot water to the outer periphery of any located beverage pod, and a kicker assembly formed in the bottom brew chamber, that supports the beverage pod during a brewing cycle, and then achieves its discharge into a waste or other bin following a brew cycle.

14 Claims, 4 Drawing Sheets

(56) References Cited

U.S. PATENT DOCUMENTS

| | | | |
|---|---|---|---|
| 7,021,198 B1 * | 4/2006 | Lyall, III | A47J 31/0642 426/77 |
| 7,093,533 B2 * | 8/2006 | Tebo, Jr. | A47J 31/0647 99/300 |
| D538,100 S | 3/2007 | Dodge | |
| D544,748 S | 6/2007 | Johansson | |
| 7,311,037 B2 * | 12/2007 | Albrecht | A47J 31/06 426/106 |
| 7,836,819 B2 * | 11/2010 | Suggi Liverani | A47J 31/0668 426/82 |
| 7,845,270 B2 * | 12/2010 | Rahn | A47J 31/0626 426/433 |
| 7,997,187 B2 * | 8/2011 | Garman | A47J 31/0573 99/304 |
| 8,180,204 B2 * | 5/2012 | Glucksman | A47J 31/057 392/328 |
| 8,250,970 B2 * | 8/2012 | Thomas | A47J 31/0663 99/289 R |
| D667,028 S * | 9/2012 | Headley, Sr. | A47J 31/0663 D15/82 |
| D670,539 S | 11/2012 | Starr et al. | |
| D670,540 S | 11/2012 | Starr et al. | |
| D675,867 S | 2/2013 | Starr et al. | |
| 8,448,565 B2 | 5/2013 | Rahn | |
| 8,561,524 B2 * | 10/2013 | DeMiglio | A47J 31/0689 210/232 |
| 8,586,116 B2 * | 11/2013 | Wroblewski | A47J 31/3671 426/433 |
| 8,607,694 B2 | 12/2013 | Blanc et al. | |
| D707,080 S | 6/2014 | Shamoon | |
| D708,895 S | 7/2014 | Hoyord et al. | |
| D711,974 S | 8/2014 | Norman et al. | |
| D721,916 S | 2/2015 | Webster | |
| 9,084,511 B2 * | 7/2015 | Clark | A47J 31/46 |

\* cited by examiner

BREWER POD HOLDER

CROSS REFERENCE TO RELATED APPLICATION

This continuation-in-part patent application claims priority to the design patent application having Ser. No. 29/442,709, filed on Apr. 24, 2013.

FIELD OF THE INVENTION

This invention generally relates to a brewer pod holder, and structure for diffusing the heated water as it is delivered over the coffee pod, and more particularly, this invention provides an improved brewing chamber for brewing multiple sizes and shapes of coffee pods, within a singular brewer, when preparing a batch of coffee, or even individual cups of the same.

BACKGROUND OF THE INVENTION

It is generally known in the field of coffee pod brewing that the coffee quantity can be affected by the placement of the coffee, pod into the pod brewing chamber. If the coffee pod is of differing sizes, this can affect the strength and flavor of the coffee being brewed. In addition, if the coffee pod is placed incorrectly, that is, off center, even mistakenly upside down, or if the pods are of various weights and diameters, the coffee quality can vary from cup to cup. For example, there are coffee pods that are available for usage that may be in the range of approximately 55-56 millimeters in diameter, and they may be symmetrical, having an arcuate surface of equal dimensions both above and below the centerline of the pod. There are other pods that are of a much greater size, approximately 72 millimeters in diameter. Many of these are asymmetrical, meaning that they are only a half pod, usually the lower half of the formed pod, which can effect their location and exposure to the heated water entering the brew chamber, during a brewing cycle. Other commercial pods may be in the size of 61 mm, in diameter, and also may be asymmetrical of design, meaning they are only of a half size, being arcuate formed on one half only, while the lower half may be flat, or vice versa. All of these different sizes, shapes, their placement within the brew chamber, can substantially affect the quality, flavor, and taste of the coffee brewed, which may provide a strong cup or beaker of coffee, or even a weak batch of coffee, which is affected by the placement of the pod within the brew chamber, and its ability to absorb and filter the heated water entering the pod, throughout the brewing cycle. Such extreme variations in the brewing of coffee, tea, or any other related beverage, does not lead to consistency, which obviously can be of irritation to the consumer, when using such pods for brewing a batch of primarily coffee, and perhaps even tea.

Various types of holders for encapsulating the grounds of a brewing substance, such as coffee, can be found in the prior art. For example, U.S. Pat. No. 6,260,476 shows a Beverage Brewing Substance Holder.

U.S. Pat. No. 6,948,420, shows a Coffee and Tea Pod, which is used for brewing the beverage, during usage.

U.S. Pat. No. 7,845,270, shows the usage of a pod, within an Apparatus, System and Method for Retaining Beverage Brewing Substance, for application during a brewing cycle.

U.S. Pat. No. 8,250,970, shows a Substance Holder with Removable Insert.

U.S. Pat. No. D670,539, shows a form of Pod Holder.

U.S. Pat. No. D675,867, shows a further design for a Pod Holder.

U.S. Pat. No. 8,448,565, shows a Loose Coffee Transfer System, that incorporates a scope like member that functions as a pod for holding loose beverage grounds during brewing.

As can be seen in FIG. 11 of the current application, the various styles and designs for the type of pods that may be used within a pod holder of a brewer are shown. As explained, the pod holder on the left is of asymmetrical design, while the middle pod holder and the right side pod holder are of asymmetrical designs. When using the asymmetrical type, the user does not know if the pod should be inserted with the arcuate surface down, or up, so therefore, there is a good chance that the pods may be located within the pod holder, in misalignment, during their application in preparation for performance of a brewing cycle. These are examples of the type of pods that are available commercially, and are being used in various brewers, currently. When used, or misused, such activity can greatly affect the quality and taste of the coffee or other beverage being brewed.

SUMMARY OF THE INVENTION

The concept of this invention is to provide a brewing chamber, within a coffee pod holder, that is shaped to accommodate a variety of commercially produced coffee pods, of a variety of shapes and designs, so as to assure that when the heated water enters the brewing chamber, of the pod holder, it is disseminated throughout the extent of the holder, so as to saturate all aspects of the beverage pod during performance of a brewing cycle. In addition, the invention contemplates the formation of various placement members, that are designed for both properly centering the coffee pod within the holder, and then further facilitates the radial permeation of the heated water to the outer periphery of the held pod, to assure that the pod becomes thoroughly saturated throughout its extent with heated water, during performance of said brewing cycle. In addition, the pod holder itself, at the region of its hot water inlet, is integrally structured so as to provide for the flow of the heated water into all regions of the upper portion of the pod holder, to assure that hot water is deposited onto the pod, to attain complete saturation and brewing of a beverage, such as coffee, during a brewing cycle.

This type of pod holder may be used within the individual coffee brewing apparatuses, such as those that might be found in the household, but more particularly is adapted for usage within commercial brewers, of the type that may be incorporated within vending like machines, or other commercial brewers, to assure that consistency is attained and maintained in the brewing of the quality and strength of coffee desired, during usage of the brewer.

The brewing chamber of the pod holder of this invention is shaped to accommodate the variety of commercially produced coffee pods, as previously reviewed, and is designed to afford consistency in the location of the pods, during their placement, in preparation for performance of a brewing cycle.

It is a principle object of this invention to provide a means in which multiple size, weight, and shaped coffee pods can be brewed in a single coffee pod brewing chamber by shaping of the chamber in such a way that the water used to brew the coffee is distributed throughout the extent of the coffee pod, while passing the heated water through all portions of the pod, while brewing of the beverage, with the coffee then exiting the chamber into a cup or other beaker or decanter regardless of how the coffee pod is inserted into the brewing chamber.

Hence, it is a primary object of this invention to attain consistency in the brewing of a batch or cup of coffee from coffee pods wherein the quality and strength of the coffee is always uniformly and consistently maintained during repeat brewing cycles.

Another object of this invention is to provide for the brewing of a consistent cup or beaker of coffee from coffee pods over repeat brewing cycles even though the pods may be loosely or unevenly located within the pod holder, in preparation for a brewing cycle.

Another object of this invention is to provide for integral structure within a pod holder that affords uniformity in the delivery of heated water for saturation of a beverage pod throughout its extent during performance of a brewing cycle.

These and other objects may become more apparent to those skilled in the art upon review of the summary of the invention as provided herein, and upon undertaking a study of the description of its preferred embodiment, in view of the drawings.

DESCRIPTION OF THE PREFERRED EMBODIMENT

Figure 1:
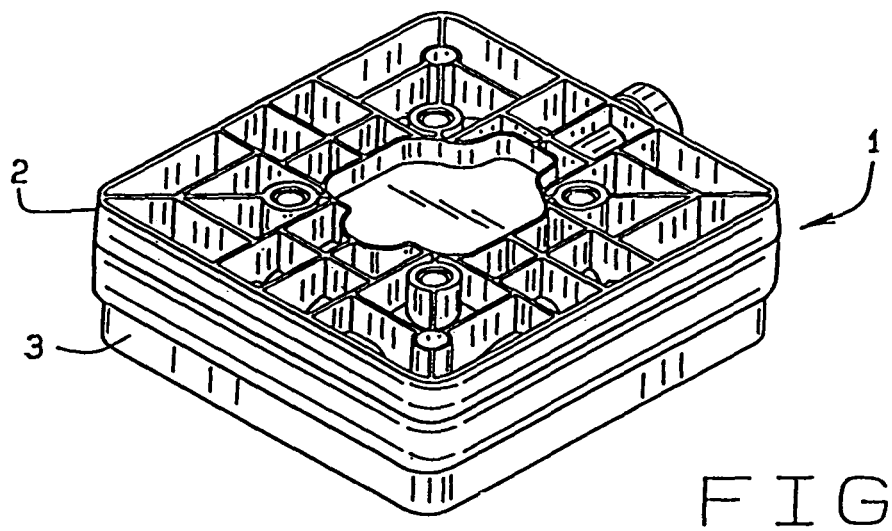
FIG. 1 shows an isometric view of the coffee pod holder of this invention.
Figure 11:
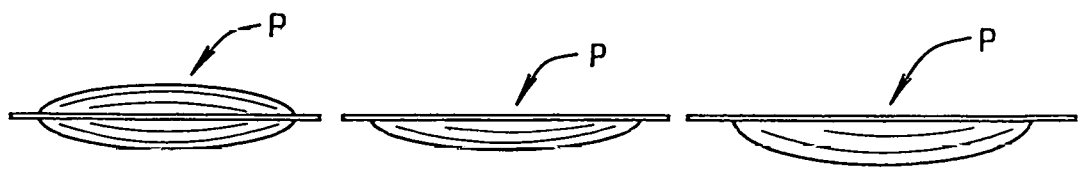
FIG. 11, once again, shows a schematic of the various shapes of the type of beverage pods that are currently available and used for brewing a coffee or other beverage.

In referring to the drawings, and in particular FIG. 1, therein is shown the brewer pod holder 1 of this invention. It includes an upper brew chamber 2 and a lower brew chamber 3. These two chambers are capable of separation, or opening, so that one of the beverage pods, such as the pods P, as shown in FIG. 11, as previously described, may be located, in preparation for a brewing cycle.

Figure 2:
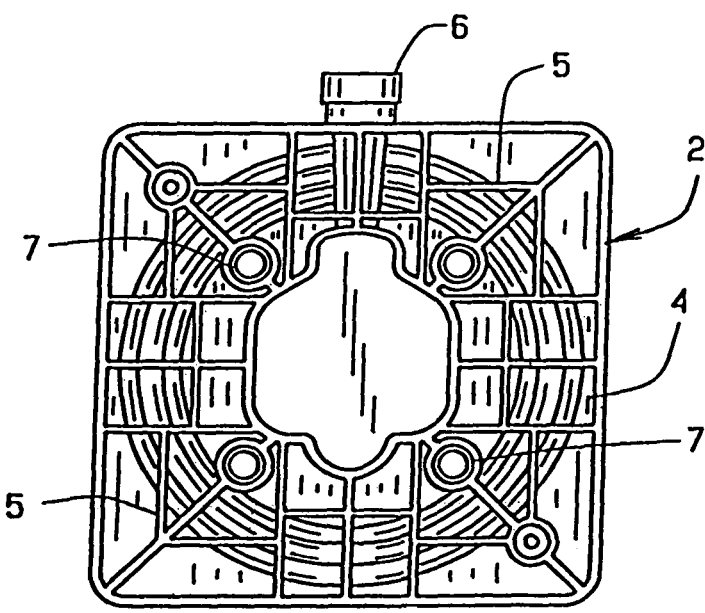
FIG. 2 is a top plan view.

The upper brew chamber 2 is generally as disclosed in FIG. 2, in its upper plan view, and shows a peripheral rim 4 that extends around its perimeter, generally in a square pattern, and includes a series of reinforcing ribs, as at 5, to provide reinforcement for its structure. A hot water inlet 6 delivers hot water into the upper brew chamber, which is disseminated therein, and discharged into its internal cavity, as will be subsequently described. A series of fastener openings, such as at 7, may provide a threaded connection for attachment with screws that secure the upper brew chamber to the operating mechanism of the housing for the brewer, so that when the housing is opened, the upper brew chamber is elevated, to provide for access into its interior.

Figure 3:
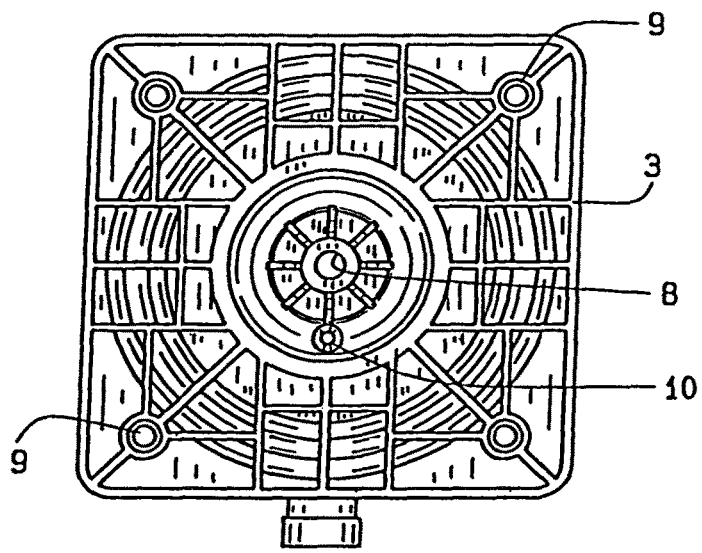
FIG. 3 is a bottom plan view.

FIG. 3 provides a view of the bottom of the lower brew chamber 3 and it has a central opening, as at 8, through which the pod kicker assembly locates, as also will be subsequently defined. The lower brew chamber likewise contains a series of fastening means, as at 9, which may be threadedly engaged to the lower portion of the brewer housing, when assembled for usage. There is also disclosed an outlet 10 through the bottom of the lower brew chamber 3, and this outlet provides for discharge of any brewed beverage, such as coffee, therefrom, during the processing and completion of a brewing cycle in brewing a cup of coffee, of the like.

Figure 4:
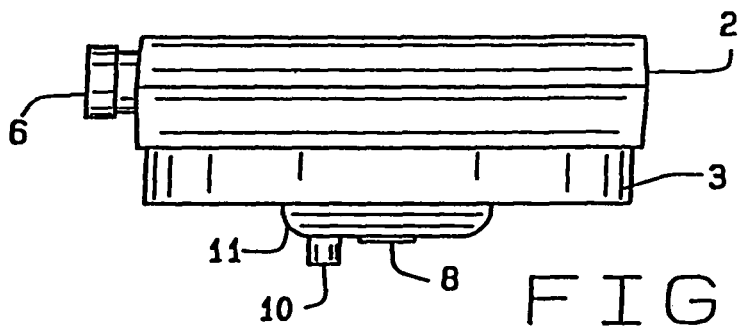
FIG. 4 is a left side view.

Other figures show other views for the brewer pod holder of this invention, such as FIG. 4 provides a left side view of both the upper brew chamber 2, its hot water inlet 6, in addition to the lower brew chamber 3. In addition, the base 11 of the lower brew chamber forms the outlet 10 while the lower stem of the pod kicker assembly 8 is arranged centrally thereof.

Figure 5:
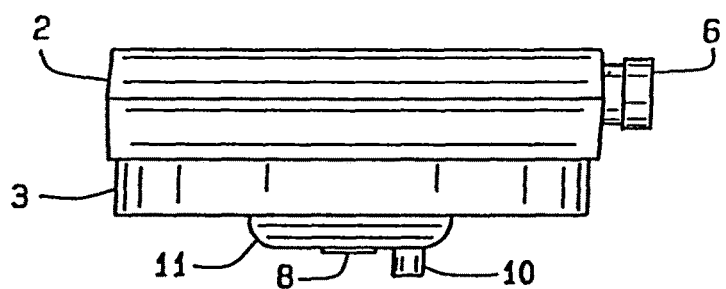
FIG. 5 is a right side view.
Figure 6:
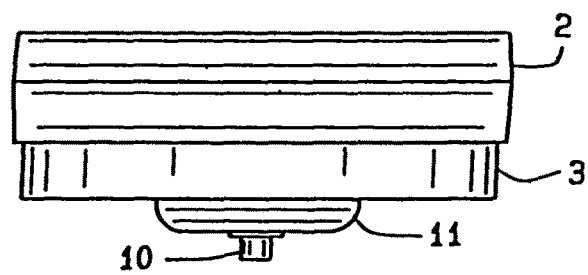
FIG. 6 is a front view.
Figure 7:
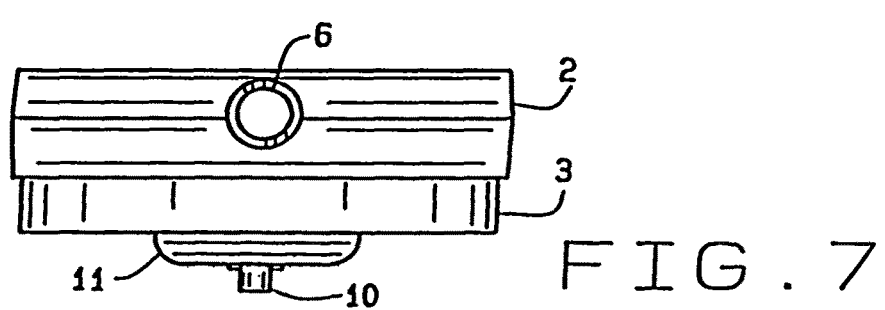
FIG. 7 is a rear view of the pod holder.

FIGS. 5-7 provide similar views of these structural features for the brewer pod holder of this invention.

Figure 8:
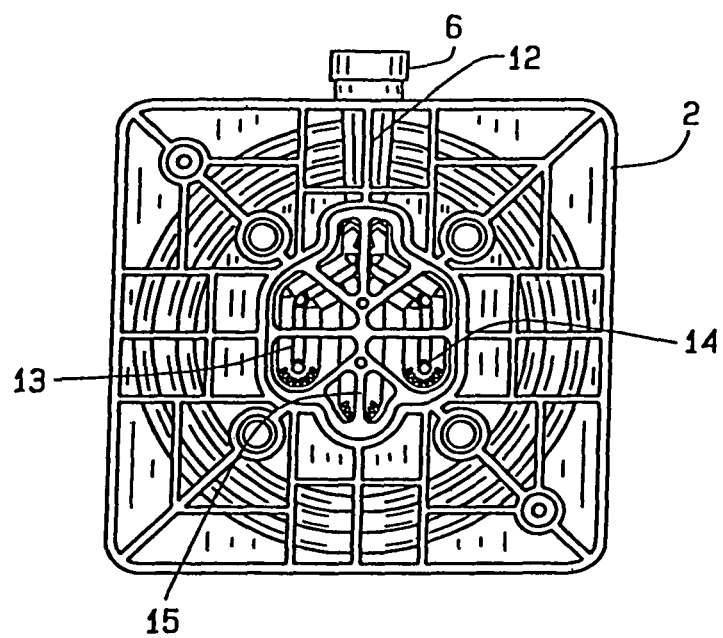
FIG. 8 provides a top plan view that further discloses the flow path of the heated water passing into the pod holder, and how it is diverted into various regions to provide for thorough saturation of the coffee pod during performance of a brewing cycle.

FIG. 8 provides a view internally of the upper brew chamber 2 and discloses how the hot water inlet 6 delivers its hot water through a conduit 12 into the upper region and cavity of the pod holder, where the water separates into three or more different paths, such as shown at 13-15, so as to provide for a separation of the delivered water, to assure that it is deposited within the upper brew chamber, and into the pod holding area for saturation of any coffee pod located therein, during processing of a brewing cycle.

Figure 9:
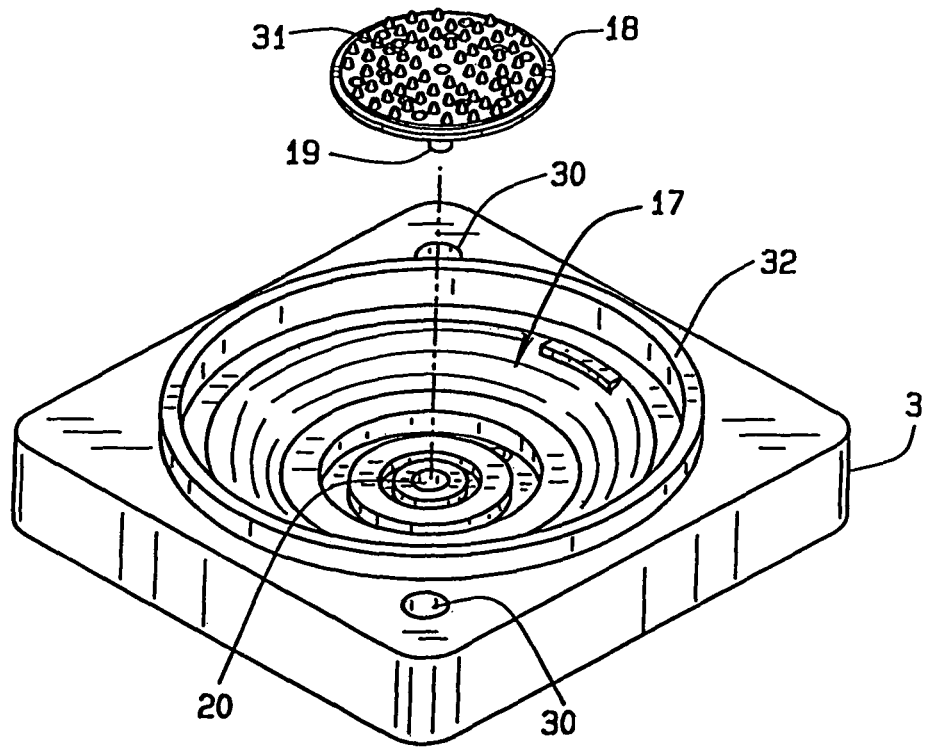
FIG. 9 is an isometric view of the bottom half of the pod holder, showing its pod kicker assembly elevated from the bottom of the holder.
Figure 10:
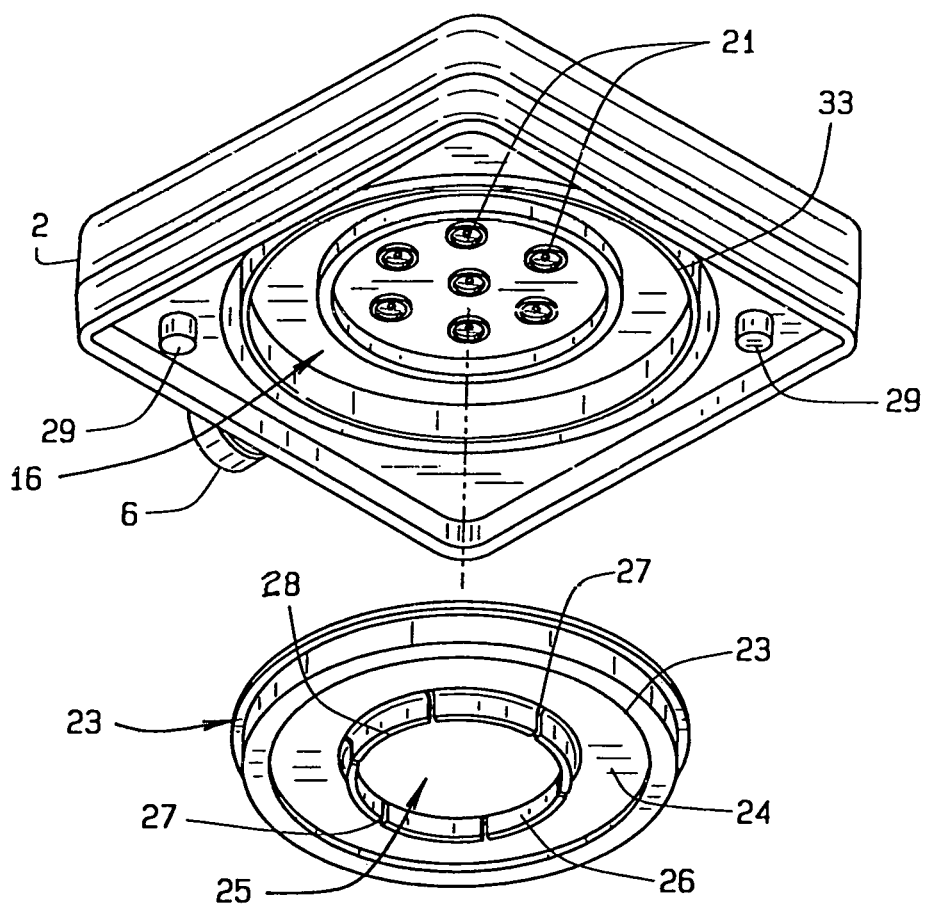
FIG. 10 is a view of the upper half of the pod holder, where the heated water enters into the holder during usage, and showing its diffuser elevated, although said diffuser is normally pressure fitted within the upper pod holder during its assembly.

The pod holding chamber is formed, approximately one half, within the upper brew chamber, as can be noted at 16, with the other half of the pod brewing chamber or cavity being formed in the lower brew chamber 3, as can be seen at 17, as noted in FIGS. 9 and 10. Thus, when the upper and lower brew chambers are brought together, after a pod has been located therein, and the brew chamber is closed, it provides an ample space for holding one of the beverage pods, of the type as explained in FIG. 11, therein, in preparation for a brewing cycle.

As can also be seen in FIG. 9, a pod kicker assembly 18 is provided for locating within the cavity 17, with its stem 19 locating through the opening 8, for the kicker assembly, as previously reviewed.

The upper brew chamber 2, as shown inverted in FIG. 10, provides a series of discharge ports 21, through which the heated water passing through the hot water inlet 6, is conducted by way of the conduits 13-15, and discharged through these ports 21, onto one of the coffee pods P, located within the chamber sections 16 and 17. Thus, a full quantity of hot water is delivered through the upper brew chamber, and deposited onto the coffee pod located therein, during a brewing cycle. To further assure that water is disseminated over the entire region of the upper surface of any beverage pod located within the holder, a diffuser 25 is normally mounted and secured within the brew chamber 2, during application. The diffuser is an annulus, formed generally at 23; it includes a solid surface 24, thereby directing any heated water entering into the pod holding area to descend through the central opening 25 and directly onto any beverage pod located within the holder. Since an ample supply of hot water is being delivered during a brew cycle, it rapidly fills the area 25 with the heated water, deposits it directly onto the coffee or tea pod located therein, fills that area to capacity, and the diffuser includes an integral concentric inner ring 26, containing a series of slots 27, which radially directs further heated water outwardly, onto the outer periphery of any beverage pod located within the holder, to assure that full saturation occurs of the pod locating therein, to achieve the brewing of the beverage throughout all segments of the entire pod, during performance of a brewing cycle. In other words, the ring 26 acts as a further disseminator of the heated water outwardly, therefrom, and onto the outer reaches of any pod located therebelow, during a brewing cycle, while the abundance of heated water that flows downwardly from the inlet ports 21, and into the diffuser opening 25, saturates the middle segment of any pod arranged therebelow, to assure complete and uniform brewing of a batch of coffee or tea. Furthermore, since the pods located therein, as previously reviewed, may have different shapes, as can be noted in FIG. 11, or may be of different sizes, the lower edges, as at 28, of the integral ring 26, will press against any pod located within the holder chamber, to try to center it, and maintain its location within the approximate center of the formed chambers 16 and 17, during a brewing cycle, to provide that uniformity of brewing of any beverage, from the pod, through the flow of the heated water therethrough, during performance of a brewing cycle.

As can further be noted, and to assure that when the upper brew chamber 3 lowers onto the lower brew chamber 2, with a pod located within the chamber segment 16, a pair of positioning pins 29 locate within the aperture 30, of the lower brew chamber 3, to assure that the brew chambers are in proper alignment, when brought into closure, and to form an effective seal, when the holder is closed in preparation for a brewing cycle.

In addition, it is to be noted that the pod support 18 includes a series of upwardly extending projections, as at 31, that helps to maintain the positioning of any beverage pod located within the holder, in preparation for a brew cycle. In addition, the pod support 18, and more particularly its lower extending rod 19, may fasten or otherwise threadedly engage with an operating mechanism, which can provide for an upward movement of the support, to discharge any spent pod, following a brewing cycle, in order to dispose of the used pod, after usage. In addition, the lower brew chamber 3 includes an annular segment, as at 32, which seals within the surface of the upper brew chamber, and more specifically just outwardly of its ring 33, in order to furnish a hydraulic seal, for the two chambers, when they are brought together in preparation for performance of a brewing cycle. It is essential that the hot water incoming within the holder, while brewing, which may be under some pressure, is sealed internally of the holder, and does not leak beyond the holder, during completion of a brewing cycle.

The pod holder of this invention, and its diffuser, may be included and used within any commercial coffee brewing and vending machine, which provides for the manual insertion of the beverage pod therein, of the customers selection, and then provides for removal of the pod, for disposal, through the manipulation of its pod support 18, during and following a brewing cycle. Or, a pod holder of this type may be used within a small individual coffee brewing apparatus, in order to provide for assured quality of brewing of a beverage, consistently, without variation in quality or flavor.

Variations or modifications to the subject matter of this invention may occur to those skilled in the art upon review of the disclosure as provided herein. Such variations, if within the spirit of this invention, are intended to be encompassed within the scope of any claims to patent protection issuing hereon. The description of the invention in the specification, and its depiction in the drawings, are generally set forth for illustrative purposes only.

I claim:

1. A brewer pod holder for use in a brewer, said pod holder provided for holding a pod of beverage grounds in preparation for brewing a volume of beverage, said holder having an upper brew chamber having a ring having a first diameter, a lower brew chamber having an annular segment having a second diameter for receiving the ring of the upper brew chamber, the second diameter being larger than the first diameter to provide a hydraulic seal for the upper brew chamber and the lower brew chamber when the brew chambers are brought together in preparation for performance of a brewing cycle, both said brew chambers capable of being brought together to provide a closed chamber having a cavity therein for holding a beverage pod during a brew cycle, said chamber capable of holding beverage pods of different sizes and shapes; and said upper brew chamber having a hot water inlet, said hot water inlet having a channel formed therethrough, for delivering hot water through a center of the upper brew chamber, said upper brew chamber including a diffuser ring, said diffuser ring mounting internally within the formed cavity of the upper brew chamber, said diffuser ring having a central opening therethrough for the deposit of hot water onto a pod of beverage grounds, said lower brew chamber having a pod support shiftably in a vertical direction mounted therein, said pod support provided for supporting the beverage pod in place during brewing, and said beverage pod support capable of shifting in the vertical direction for removal of the spent pod after performance of a brew cycle and the upper and lower brew chambers become separated.

2. The beverage pod holder of claim 1 wherein the hot water inlet, and its internal channel, separates into a plurality of flow paths for the hot water for delivering it to various locations in the upper brew chamber and for its distribution onto the contained beverage pod during performance of a brew cycle.

3. The beverage pod holder of claim 2 and said diffuser ring including an integral concentric inner ring for pressing against a pod in the closed chamber during a brewing cycle, said inner ring having a series of radial slots, such that when the hot water enters the upper brew chamber it passes centrally through the diffuser ring for saturation of the beverage pod, and the diffuser ring passing excessive hot water through its various radial slots for saturation of the outer periphery of the beverage pod during performance of brew cycle.

4. The brewer pod holder of claim 1 wherein said pod support incorporates a plate, said plate having a downwardly extending stem securing therewith, said brewer incorporating an operating mechanism, and said stem capable of connecting with the operating mechanism to provide for shifting of the pod support in the vertical direction after performance of a brew cycle for dispensing of a spent pod after brewing.

5. The beverage pod holder of claim 4 wherein the upper surface of said pod support including a series of upward projections, upon which the beverage pod is located and supported during brewing.

6. The beverage pod holder of claim 3 wherein the beverage pod locates within the cavities formed internally of the upper and lower brew chambers, and is secured therein between the downward pressures of said diffuser ring forcing the beverage pod against the pod support.

7. The beverage pod holder of claim 1, wherein the lower brew chamber includes an outlet, for dispensing of any brewed beverage exiting the beverage pod and from within the secured upper and lower brew chambers during performance of a brewing process.

8. A brewer pod holder for use in a brewer, the pod holder provided for holding a pod of beverage grounds in preparation for brewing a volume of beverage, the brewer pod holder comprising:
- an upper brew chamber having an interior upper pod holding chamber, a peripheral rim that extends around the upper brew chamber, an exterior side opposite the interior upper pod holding chamber with the exterior side having a series of reinforcing ribs and a series of fastener openings, a hot water inlet positioned along the peripheral rim, a conduit connected to the hot water inlet, a series of discharge ports connected to the conduit for allowing hot water to flow from the hot water inlet through the conduit and out the series of discharge ports into the upper pod holding chamber, a ring formed between the peripheral rim and the series of discharge ports, the ring having a diameter;
- a diffuser having a central opening, an integral concentric inner ring formed around the central opening, the inner ring having a series of slots, an annulus, a solid surface between the inner ring and the annulus, the diffuser for fitting into the ring of the upper brew chamber;
- a lower brew chamber having an interior lower pod holding chamber, a central opening, an annular segment for receiving the ring of the upper brew chamber, the annular segment having a diameter larger than the diameter of the ring of the upper brew chamber to provide a hydraulic seal for the upper brew chamber and the lower brew chamber when the brew chambers are brought together in preparation for performance of a brewing cycle.

9. The brewer pod holder of claim 8 further comprising a pod kicker assembly for positioning within the lower pod holding chamber of the lower brewer chamber.

10. The brewer pod holder of claim 9 wherein the pod kicker assembly further comprises an extending rod.

11. The brewer pod holder of claim 9 wherein the pod kicker assembly further comprises an upper surface and a series of upward extending projections to maintain the positioning of a beverage pod placed on the pod kicker assembly.

12. The brewer pod holder of claim 8 wherein the upper pod holding chamber further comprises a positioning pin and the lower pod holding chamber further comprises an aperture with the positioning pin fitting within the aperture to align the upper brew chamber with the lower brew chamber.

13. The brewer pod holder of claim 8 further comprising a pod kicker assembly having an extending rod with the extending rod extending through the central opening of the lower brew chamber.

14. The brewer pod holder of claim 8 wherein the lower brew chamber further comprises a base having an outlet.

* * * * *